Figures 1, 2:
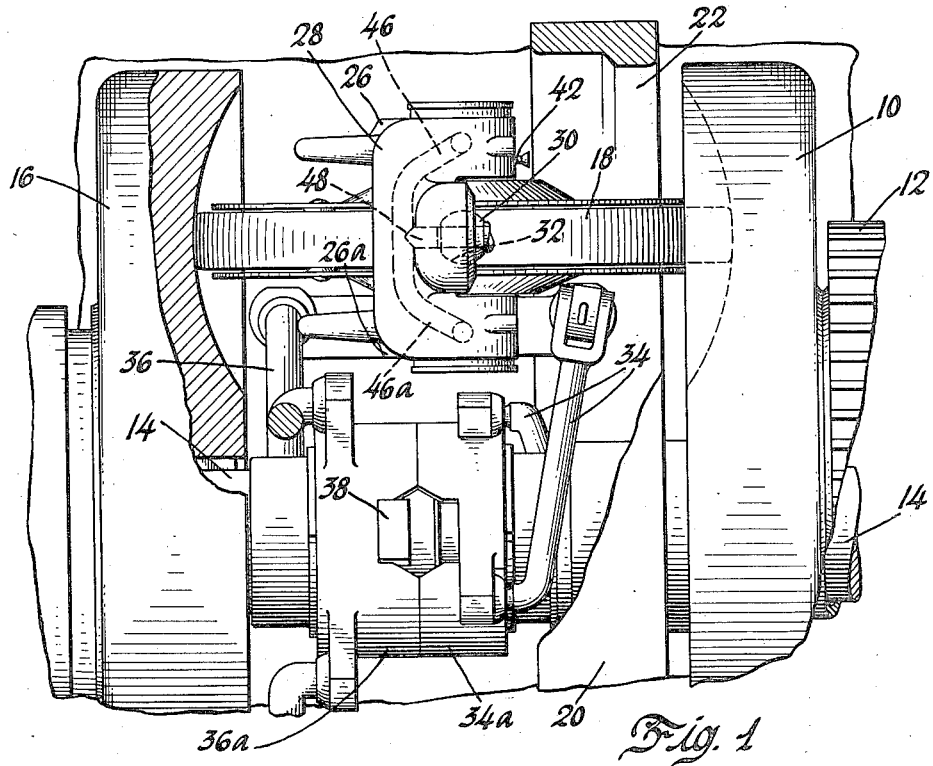

Sept. 17, 1935.   J. O. ALMEN   2,014,922

ROLLER CARRIER DASHPOT FOR FRICTION TRANSMISSION

Filed Jan. 10, 1935

Inventor
John O. Almen

By Blackmore, Spener & Flint
Attorneys

Patented Sept. 17, 1935

2,014,922

UNITED STATES PATENT OFFICE 2,014,922

ROLLER CARRIER DASHPOT FOR FRICTION TRANSMISSION

John O. Almen, Royal Oak, Mich., assignor to General Motors Corporation, Detroit, Mich., a corporation of Delaware Application January 10, 1935, Serial No. 1,259

4 Claims. (Cl. 74—200)

This invention relates to variable speed ratio friction transmission mechanism, and more particularly to transmissions of race and roller type wherein each roller is inclinable about an axis connecting its center with the point of contact between it and the race in order to initiate change of ratio position with respect to the race.

In this type of transmission, inclining a roller about its said axis of inclination causes it to roll in a spiral path on the race, thus steering itself to a new ratio position.

The principal object of the invention is to prevent rapid oscillations of the roller or rollers of a race and roller transmission under certain operating conditions.

The invention consists of one or more rollers mounted in movable carriers, and damping means, preferably of hydraulic type, arranged to dampen relative oscillations or reciprocations between carrier and roller.

In the drawing, in which like reference characters indicate like parts in each of the views, Fig. 1 is a fragmentary view, partly in section, of a toroidal race and roller transmission mechanism embodying this invention.

Fig. 2 is a view showing one roller and its carrier, partly in section, to expose the roller axle within the bearings of the carrier.

In the drawing, numeral 10 indicates a toroidal race which may be deemed to be the input member of the race and roller transmission mechanism fragmentarily illustrated. Race 10 is rotated in normal forward driving by means of an engine operated drive mechanism, not illustrated, geared to the gear 12 which rotates the race 10 with it. Race 10 is mounted so as to rotate around the axis of output shaft 14 and independently of said shaft. Numeral 16 indicates a driven or output race keyed to output shaft 14 so as to rotate with it. A roller 18 is interposed between races 10 and 16 in tractive contact with both. Interposed roller 18 transmits power from input race 10 to output race 16. Output shaft 14, rotated by output race 16, may, for example, be geared to the ring gear of a differential axle gearing, as illustrated in application Serial No. 724,243, filed May 7, 1934, in the name of Jacob Ehrlich.

Numeral 20 indicates a rigid frame member having openings 22 within which each roller 18 is disposed so as to rotate in contact with both races 10 and 16. Each roller has an axle or arbor 24 rotatable in bearings provided in the limbs 26 and 26$^a$ of a forked carrier 28 pivoted by a universal joint to the frame member 20. The universal joint is indicated in Fig. 1 by an axially perforated, spherical headed pin 30 fastened to frame 20, the spherical head being seated in a cavity 32 in the carrier 28. Links 34 and 36 connected, respectively, at one end to carrier 28 at opposite sides of the roller axis and at their other ends to selectively operated control collars 34$^a$ and 36$^a$,—together with a selective coupling 38, adapted to be engaged with collar 34$^a$ or collar 36$^a$, depending on the direction or sense of rotation of the races, constitute control means for varying the ratio position of the rollers. This control means is fully disclosed and claimed in an application of Almen and Gove, filed December 20, 1934, Serial No. 758,394.

Bearing bushings snugly seated in limbs 26 and 26$^a$ of each carrier 28 for receiving the roller axle 24, are indicated in Fig. 2 by reference characters 40 and 40$^a$; their outer ends are closed by caps 52, 52$^a$; they surround the axle at each side of the roller with a nice bearing fit, and are locked in place in cavities in the limbs 26, 26$^a$ of the carrier by keys 42. Annular grooves 44 and 44$^a$, formed in bushings 40 and 40$^a$, respectively, communicate with oil ducts 46 and 46$^a$ in the limbs of the carrier branching from an oil duct 48 which communicates with the perforation in pivot pin 30 communicating with a duct (not illustrated) in the frame member 20. Oil under pressure may be supplied to duct 48 by any suitable means, not shown. Bearing bushings 40 and 40$^a$ are fitted tightly in the limbs, with their inner ends spaced apart sufficiently to afford clearance allowing axial sliding movement of the carrier limbs with respect to the roller axis, as indicated in Fig. 2, thus providing for expansion and contraction alternately of the oil chambers between the ends of the axle and the caps 52, 52$^a$.

When roller 18 is in its normal running position with its axis, if extended, intersecting the race axis, the roller occupies a central position between the bushings 40 and 40$^a$, and the axle 24 extends at each end slightly beyond the grooves 44, 44$^a$, as shown. The only outlet for oil received into the grooves from the ducts 46, 46$^a$, is through the spaces between the bushings and the axle. Oil flows from annular groove 44 between axle and bushing into the chamber 50 between the cap 52 and the adjacent end of axle 24, and also from said annular groove between axle and bushing onto one side of the roller. Similarly, oil flows from annular groove 44$^a$, between axle and bushing into chamber 50$^a$ between cap 52$^a$ and the other end of axle 24, and also between axle and bushing 40ª onto the other side of the rollers.

Thus the volumes of oil in the chambers 50, 50ª between the ends of the axle and the caps on the bushings resist relative axial motion between carrier and roller. The proportions are such that when the inner end of a bushing is in contact with the roller the bushing on the other side will have been moved enough to let oil feed freely from the adjacent annular groove and duct into the chamber on that side between the end of the axle and the bushing cap. Oil in the chamber is thus replenished rapidly during relative axial movements of carrier and rollers. The chambers and axle constitute a double ended dash pot which dampens relative movement of roller and carrier. In the type of transmission to which this invention is shown applied, ratio change of roller 18 is initiated by inclining it about a line connecting its points of contact on the races. This inclination is effected by the control mechanism illustrated in part in Figs. 1 and 2 and fully described and illustrated in the application of Almen and Gove referred to. In the act of changing the speed ratio between output and input races the carrier is caused to swing slightly about its pivotal connection to the frame. This causes the carrier bearings to slide on the roller axle, the roller being now pinched by heavy pressure between the races. As the carrier swings about its pivotal point the axle is caused to incline about its inclination axis, whereupon the roller begins to spiral on the races and tilt toward a new ratio position. Under some conditions of running, particularly when changing ratio, without damping or with too low a value of damping, rollers are apt to oscillate rapidly about an equilibrium position. The hydraulic damping means disclosed effectively prevents such oscillations.

I claim:

1. In transmission mechanism comprising frictional power transmitting elements in rolling contact, one of which is a roller, a pivoted carrier for the roller movable slightly axially with respect to the roller, and damping means reacting between roller and carrier.

2. In transmission mechanism comprising frictional power transmitting elements in rolling contact one of which is a roller having an axle, a forked carrier having bearings for receiving the axle, said bearings being closed at their outer ends, fitting snugly over the axle and spaced apart sufficiently to permit limited movement of the carrier lengthwise of the axle, there being a fluid receiving chamber between each end of the axle and the closed end of the corresponding bearing.

3. In transmission mechanism comprising frictional power transmitting elements in rolling contact, one of which is a roller having an axle, a pivotally supported forked carrier having bearings closed at their outer ends and fitting snugly over the axle and spaced apart sufficiently to permit movement of the carrier lengthwise of the axle, there being chambers between the ends of said axle and the closed ends of the bearings, annular grooves in the bearings adjacent the ends of the axle, and oil conduits communicating with the grooves.

4. In transmission mechanism comprising frictional power transmitting elements in rolling contact, one of which is a roller having an axle projecting from both faces thereof, a carrier having alined bearings snugly receiving the projecting portions of the axle, said bearings having closed outer ends to form oil receiving chambers between the axle ends and the closed ends of the bearings and being spaced apart sufficiently to receive the roller between them and permit relative movement of the carrier and roller in the direction of the roller axis, said bearings having annular grooves arranged to be closed by the axle when the roller is centrally disposed between the bearings but to be opened to the adjoining chamber alternatively when the roller and carrier are at one limit or the other of their relative movement, there being oil conduits in the carrier communicating with said annular grooves.

JOHN O. ALMEN.